United States Patent [19]

Jacobs

[11] 3,978,729
[45] Sept. 7, 1976

[54] CIRCUIT FOR MONITORING TEMPERATURE OF HIGH-VOLTAGE EQUIPMENT

[75] Inventor: Martin E. Jacobs, Chillicothe, Ohio

[73] Assignee: The United States of America as represented by the United States Energy Research and Development Administration, Washington, D.C.

[22] Filed: Dec. 9, 1975

[21] Appl. No.: 639,134

[52] U.S. Cl. .............................. 73/359 R; 73/362.4
[51] Int. Cl.² .......................................... G01K 7/02
[58] Field of Search ........ 73/359, 361, 341, DIG. 6, 73/362.4, 339, 362.5; 250/199, 214 R; 340/190

[56] References Cited
UNITED STATES PATENTS

| 3,488,586 | 1/1970 | Watrous et al. | 250/214 R |
| 3,940,987 | 3/1976 | Green et al. | 73/359 |

Primary Examiner—Donald O. Woodiel
Attorney, Agent, or Firm—Dean E. Carlson; David S. Zachry; Fred O. Lewis

[57] ABSTRACT

This invention relates to an improved circuit for measuring temperature in a region at high electric potential and generating a read-out of the same in a region at lower potential. The circuit is specially designed to combine high sensitivity, stability, and accuracy. A major portion of the circuit situated in the high-potential region can take the form of an integrated circuit. The preferred form of the circuit includes an input section which is situated in the high-potential region and comprises a temperature-compensated thermocouple circuit for sensing temperature, an oscillator circuit for generating a train of ramp voltages whose rise time varies inversely with the thermocouple output, a comparator and switching circuit for converting the oscillator output to pulses whose frequency is proportional to the thermocouple output, and a light-emitting diode which is energized by these pulses. An optical coupling transmits the light pulses generated by the diode to an output section of the circuit, situated in a region at ground. The output section comprises means for converting the transmitted pulses to electrical pulses of corresponding frequency, means for amplifying the electrical pulses, and means for displaying the frequency of the same. The preferred embodiment of the overall circuit is designed so that the frequency of the output signal in hertz and tenths of hertz is equal to the sensed temperature in degrees and tenths of degrees.

9 Claims, 3 Drawing Figures 3,978,729

CIRCUIT FOR MONITORING TEMPERATURE OF HIGH-VOLTAGE EQUIPMENT

BACKGROUND OF THE INVENTION

This invention relates broadly to remote-display circuits for sensing the operating temperature of equipment situated in a region at relatively high electrical potential and for generating, in a region at lower potential, a voltage signal indicative of that temperature. More particularly, it relates to a highly compact and accurate circuit for directly sensing the operating temperature of a high-voltage device and for generating at a remote location an output signal whose frequency in pulses per second equals the measured temperature as expressed in degrees on a selected temperature scale.

This invention was made in the course of, or under, a contract with the Energy Research and Development Administration.

U.S. Pat. No. 3,488,586 describes a circuit for measuring a variable at a selected location and displaying, at a more remote location, an output indicative of the measured variable. The system is designed to generate a d.c. electrical control signal whose magnitude varies with the measured variable. This signal is connected to a pulsed electrical signal whose frequency varies with the magnitude of the control signal. The pulsed signal is converted to light pulses of like frequency, which are transmitted through a light pipe to a remotely disposed receiver. The receiver re-converts the light pulses to an electrical signal of like frequency, and this signal is converted to an output signal indicative of the measured variable. More specifically, the receiver includes a multivibrator which generates a pulse for each of the received light pulses; the pulses from the multivibrator are averaged by a meter to provide a visual indication of the value of the control signal. Alternatively, the multivibrator output is converted to a replica of the original analog control signal.

The present temperature-measuring circuit is an improvement over the above-identified prior circuit in several important respects. First, the sensitivity of the improved circuit is higher by a factor of about 100, yet the circuit is highly stable. Second, the major portion of the input circuit to the above-mentioned light pipe is designed so that it can take the form of a highly compact integrated circuit, one not requiring choke coils or complex SCR-resetting circuits. Third, excellent temperature compensation is provided despite the fact that the signal level is low. In addition, the present circuit permits direct coupling of the thermocouple, whereas the prior circuit intermixes signal and bias to the extent that the thermocouple cannot be so connected.

SUMMARY OF THE INVENTION

It is an object of this invention to provide an improved system for directly measuring the operating temperature of high-voltage equipment and generating a signal indicative thereof in a region at a lower voltage or at ground.

It is another object to provide an improved remote-display temperature-measuring system having input circuitry which can be in the form of an integrated circuit.

It is another object to provide a remote-display system for accurately measuring temperature as determined with a thermocouple, the system including circuitry for maintaining the output from the thermocouple reference junction at a valve corresponding to a preselected reference temperature, despite changes in ambient temperature.

Other objects will be made evident hereinafter.

This invention can be summarized as follows: a circuit for monitoring the operating temperature of a device situated in a region at relatively high electrical potential and for generating, in a region at a lower electrical potential, an output signal whose frequency is indicative of said temperature comprising: a d.c. power supply; thermocouple-including circuitry for generating a d.c. voltage proportional to said operating temperature; a temperature-compensated operational amplifier for generating a linear ramp voltage whose time of rise varies inversely with the magnitude of said d.c. voltage, said amplifier having an input which is coupled to said circuitry through a resistor; a comparator circuit operatively coupled to the operational amplifier for producing a negative output voltage when the magnitude of said ramp voltage is below a preselected value and for producing a positive output voltage when the magnitude of the ramp voltage increases to said preselected value; a capacitor connected across the operational amplifier; a field-effect transistor connected across said capacitor; a switching circuit coupled to the output of said comparator circuit for biasing said transistor off when the output voltage of said comparator circuit is negative and for turning said transistor on when the output voltage of said comparator circuit swings positive and maintaining said transistor on for a time effecting complete discharge of said capacitor; a light-pulse generating circuit which includes a light-emitting semiconductor component and is coupled to the output of said comparator circuit for energizing said component for a preselected period each time said comparator circuit output swings positive, thereby generating a train of light pulses whose repetition is proportional to said operating temperature; and an output circuit which includes a light-activated semiconductor device optically coupled to said light-emitting component for converting said train of light pulses to an electrical output signal having the same repetition rate.

BRIEF DESCRIPTION OF THE PREFERRED EMBODIMENT

The invention will be illustrated herein chiefly in terms of a preferred embodiment designed to monitor the operating temperature of a high-voltage transformer and to generate, in a region at ground potential, an output signal whose frequency in terms of pulses per second equals the transformer temperature as expressed in terms of the Fahrenheit scale. The circuit to be described can be composed throughout of standard individual components —i.e., standard transistors, thermistors, operational amplifiers, etc.

Figure 1:
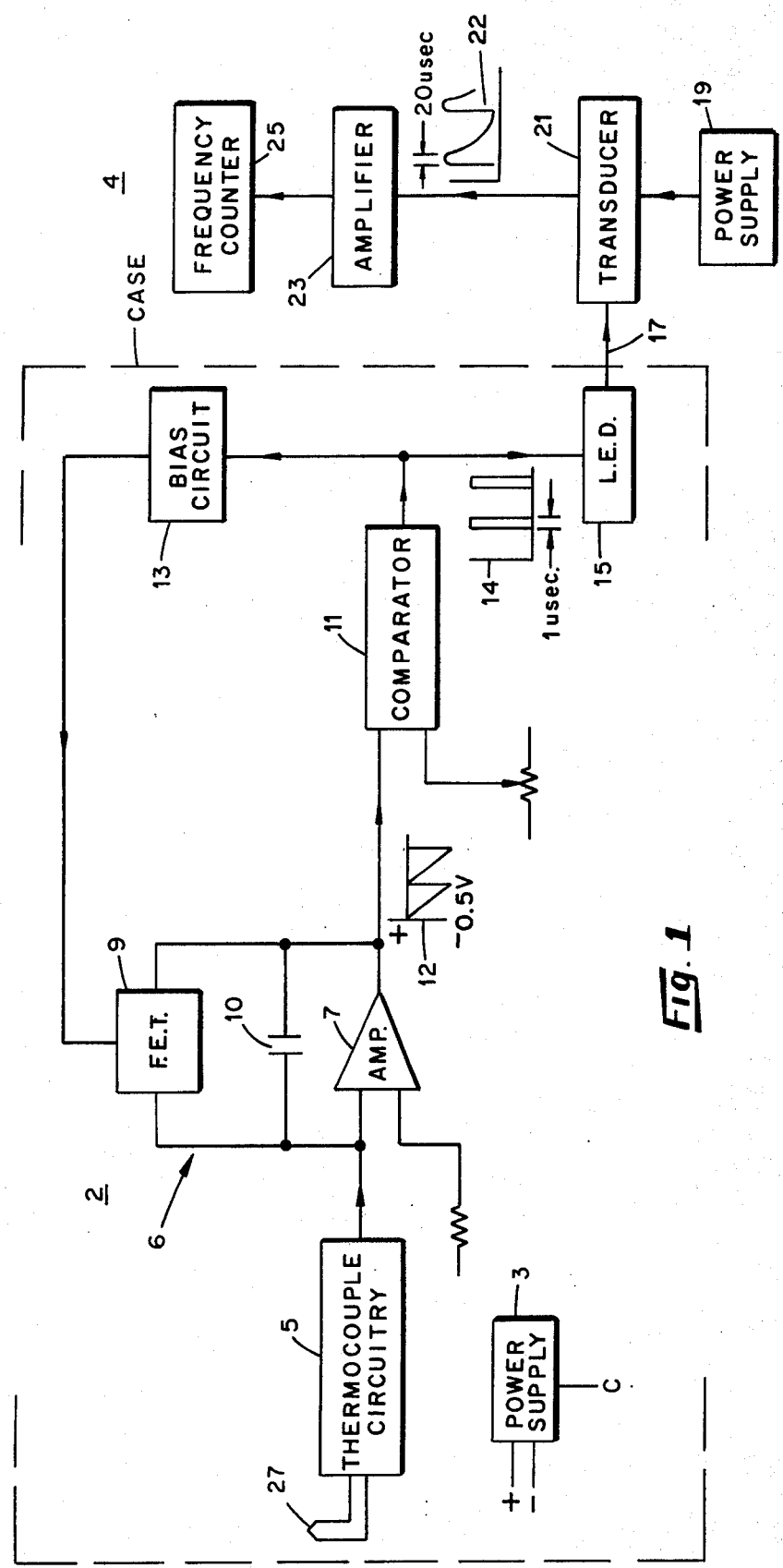
FIG. 1 is a block diagram of a circuit designed in accordance with this invention.

Briefly, the circuit as shown in FIG. 1 includes an input section 2, which is coupled by a light-pipe 17 to an output section 4. Section 2 includes a thermocouple measuring junction 27A (FIG. 2), which is embedded in the winding of the transformer 1 being monitored.

The remainder of section 2 is mounted within the transformer casing, physically close to the part of the winding containing the junction. The measuring junction 27A is part of a thermocouple circuit 5 which generates an output voltage whose magnitude is proportional to the operating temperature of the transformer. This voltage is the input to a voltage-controlled oscillator circuit 6. The oscillator circuit includes an operational amplifier 7, which generates a negative linear-ramp output voltage. The time of rise of the ramp voltage varies inversely with the magnitude of the amplifier input, and thus with the operating temperature of the transformer. Connected across the amplifier 7 is a low-leakage capacitor 10, which is paralleled by a field-effect transistor (F.E.T) 9. Normally, the latter is biased to the non-conductive state by a switching circuit 13; because of its very high impedance, the F.E.T. does not affect the charge-rate of the capacitor. The voltage from the amplifier 7 is fed to a comparator 11, and when this voltage reaches a preselected set point the comparator output swings from negative to positive. This causes the switching circuit 33 to turn on the F.E.T. 9 with minimum delay. Conduction of the F.E.T. discharges the capacitor 10, reducing the amplifier 7 output to zero. The output of this amplifier is a train of like ramp voltages 12 whose rise time is inversely related to the temperature of the transformer, whereas the output of the comparator is a series of constant-magnitude pulses 14 whose width corresponds to the pulse-transit time through components 13, 9, and 11 (typically about one microsecond) and whose frequency is directly related to the transformer temperature.

When the comparator output swings positive, the output is also applied to an infra-red light-emitting-diode (L.E.D.) 15. As a result, the diode generates a train of constant-magnitude light pulses having the same frequency as the comparator output. These pulses are transmitted to the output section 4 through a bundle of optical fibers 15.

Still referring to FIG. 1, the output section 4, or ground side, of the circuit includes a photo-electric transducer 21, for converting the light pulses 15 to an electrical output of like frequency. This output is fed to an amplifier 23, whose output is a series of pulses 22. The pulses 22, are fed to a frequency counter 25 having a digital display.

In the illustrative form of the invention shown, the sections 2 and 4 are provided with separate d.c. power supplies 3 and 19. The supply 3 is designed with three outputs which, as referenced to a common terminal C (FIG. 2), are +18 volts, +15 volts, and −15 volts. The +15-volt supply is temperature-stabilized to vary by no more than 25 millivolts over a temperature range of 70°–170°F. The other supply 19 has a +15 volt output. To minimize battery drain in the supply 3, any suitable means (not shown) may be provided for operating this supply intermittently. For instance, this supply may incorporate a switch operated by a photoelectric transducer whose input is coupled through optical fibers to a switch-controlled light source in the ground-potential region. Electromagnetic and electrostatic effects in section 2 of the circuit are minimized by mounting the thermocouple leads side-by-side and enclosing the circuitry in suitable shielding.

Figure 2:
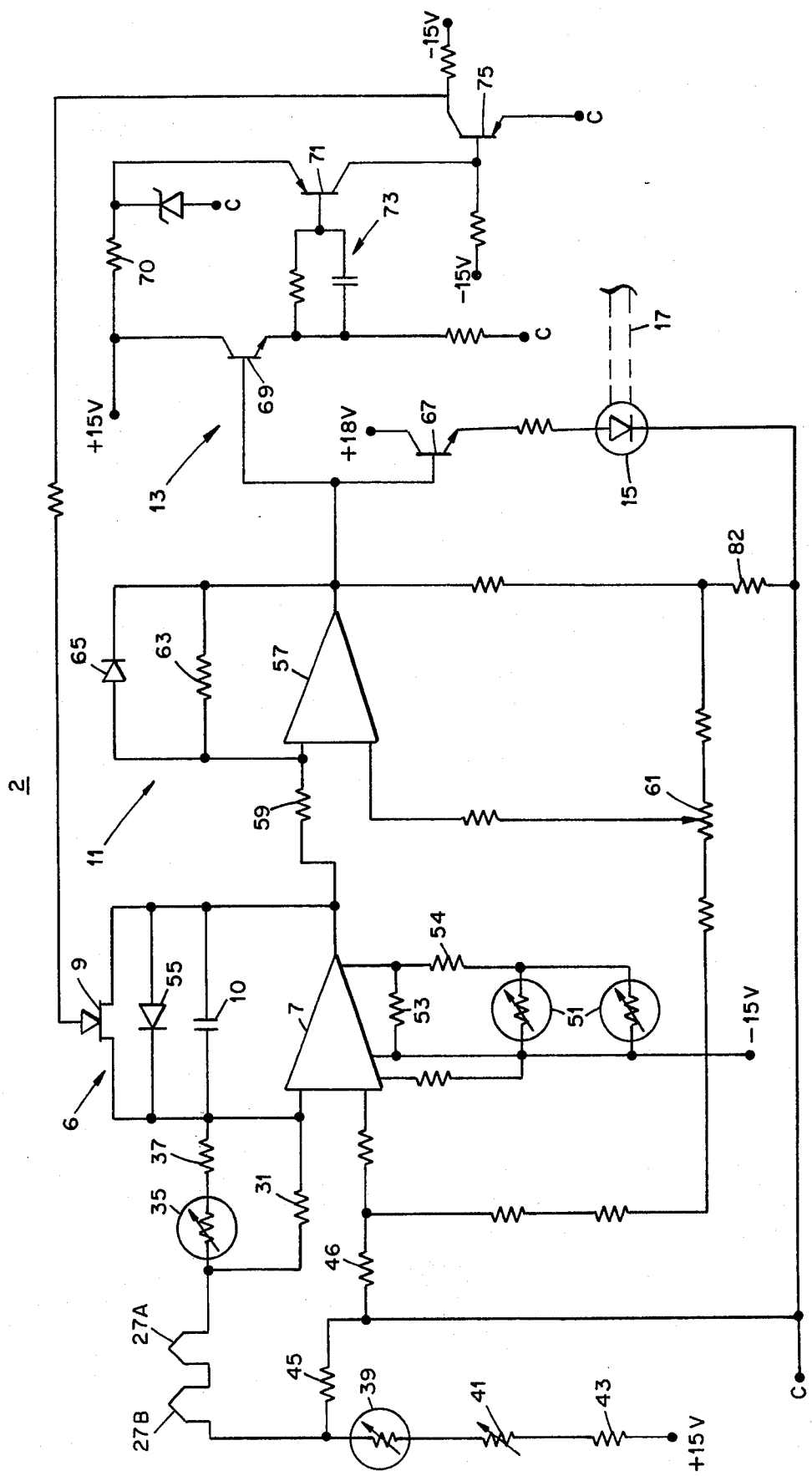
FIG. 2 is a schematic diagram of an input section 2 of the circuit shown in FIG. 1.

Referring to the more detailed drawing of FIG. 2, the temperature-sensing portion of the input circuit 2 includes thermocouple measuring and reference junctions 27A and 27B, respectively. The measuring junction preferably is mounted upon or in the transformer winding, whereas the reference junction is disposed apart from the winding and thus is exposed to the ambient temperature. The terminal 28 of the measuring junction is connected through a highly stable resistor 31 to the inverting terminal of an operational amplifier 33. Connected across the resistor 31 is a series combination of a negative-temperature-coefficient (NTC) thermistor 35 and a resistor 37 for off-setting temperature-induced variations in the value of the time constant for resistor 31 and capacitor 10. Alternatively, the capacitor 10 can be a commercially available type whose capacitance is essentially unchanged by temperature changes.

The lead from the reference junction 27B is connected to the inverting terminal of amplifier 33 through a series of resistors including a temperature-compensating resistor 45. The NTC thermistor 39 and the reference junction are mounted to the same metal base so as to be at the same temperature. The terminal 46 common to the reference junction and resistor 45 is connected to the temperature-stabilized +15 volt supply through a series combination of an NTC thermistor 39, a variable resistor 41, and a fixed resistor 43. This combination is provided to produce across resistor 45 a voltage drop which cancels the voltage output of the reference junction over the aforementioned range of ambient temperatures; as a result, the output from the thermocouple 27 corresponds to what it would be if the reference junction were maintained at ice-bath temperature. For example, in the illustrative circuit described herein the thermocouple junctions are copper-constantin (output, zero at 32°F) and the compensating resistor 45 is 8 ohms. The thermistor 39 is a 10,000-ohm bead-type (manufactured by Fenwall electronics, Framingham, Mass.), and the resistors 41 and 43 have values of 10K and 15K ohms, respectively. Such an arrangement can be calibrated so that over the anticipated range of ambient temperature—say, 70° to 170°F— the output of the thermocouple corresponds to what it would be if the reference junction were at 32°F. Calibration is accomplished by immersing the measuring junction in an ice bath and, with the reference junction at a temperature in the aforementioned range, setting the adjustable resistor 41 to the position where the voltage across terminals 28 and 46 is zero. This arrangement for providing reference junction compensation is an integral part of the overall temperature-monitoring circuit, utilizing the same power supply.

Referring to the voltage-controlled oscillator circuit 6, the amplifier 7 is shunted not only by the aforementioned capacitor 10 and F.E.T. 9, but by a diode 55, which is provided to prevent amplifier 7 from saturating, if ever its inverting input goes negative. The inverting terminal of the amplifier is connected to the thermocouple 27 as described, whereas the non-inverting terminal is connected to the −15 volt supply through an adjustable resistor 50. The amplifier output is a negative linear ramp voltage whose rise-time varies inversely with the magnitude of the input voltage from the thermocouple. The inherent tendency of the amplifier to drift with temperature is essentially eliminated by a compensating network composed of two thermistors 51 and a resistor 54. The network is connected across a resistor 53 in the offset circuit of the amplifier.

The comparator circuit 11 includes an operational amplifier 57, whose inverting terminal is connected through a resistor 59 to the output of the amplifier 7. Connected across the comparator amplifier 57 are a feedback resistor 63 and a diode clamp 65. The non-inverting 57 are a feedback resistor 63 and a diode clamp 65. The non-inverting terminal of amplifier 57 is connected to the −15 volt supply through a potentiometer 61, which is set to approximately 0.5 volt initially to be in the upper temperature calibration range. Diode 65 holds the comparator output to about −0.7 volt to prevent amplifier saturation. The output swings positive when the ramp voltage on the inverting terminal of the amplifier exceeds about −0.5 volt.

Connected to the output of amplifier 57 are parallel transistors 67 and 69. These transistors normally are held off by conduction through the diode 65, but when the ramp voltage reaches about −0.5 volt and swings the amplifier 57 output positive, the diode stops conducting, forward-biasing the transistors. Conduction of transistor 67 energizes the L.E.D. 15, as will be described in a subsequent paragraph. Conduction of the transistor 69 (the first stage of the F.E.T. biasing network 13) immediately turns off the second-stage transistor 71. A time delay (e.g., 6 microseconds) is provided by an RC network 73 which couples transistors 69 and 71 to provide sufficient time for capacitor 10 to discharge completely. Zener diode 70 is a reference voltage for the emitter of transistor 71. The turning off of transistor 71 turns on third-stage transistor 75, removing the bias from the F.E.T. 9 bridging the oscillator amplifier 7. As a result, the capacitor 10 is discharged (typically within one microsecond), dropping the inverting input to the comparator amplifier 57 to zero. When this input falls below the non-inverting input to amplifier 57, the L.E.D. driver transistor 67 and the biasing transistor 69 is returned to "off", and after about 6 microseconds transistor 75 is turned off. Thus, the ramp output from the oscillator amplifier 7 has the wave shape 12 (FIG. 1) and a peak value of −0.5 volt, whereas the comparator output has a wave shape 14 (FIG. 1) and a pulse width of essentially one microsecond. During calibration of the overall circuit, the resistor 50 connected to the non-inverting terminal of the oscillator amplifier is set to provide a ramp-voltage output of 32.0 hertz when the inverting input to this amplifier is zero—i.e., when the thermocouple measuring junction is at 32.0°F. Similarly, during calibration the potentiometer 61 in the non-inverting input to the comparator amplifier 57 is adjusted for a comparator output of 212.0 hertz when the measuring junction is at 212.0°F. Thus, throughout this range there is a one-to-one relation between the transformer temperature in degrees and tenths of a degree Fahrenheit and the frequency of the comparator output.

As indicated, each time the output of the comparator amplifier 57 swings positive, the L.E.D. driver transistor 67 is forward-biased for the aforementioned period. This transistor power amplifies the comparator output pulses and impresses them across the L.E.D. 15. The L.E.D. is selected to have a relatively short rise time (e.g., 0.5 microsecond), and its output is a series of light pulses having a frequency corresponding to that of the comparator output. These light pulses are transmitted from the high-potential region to the output section 4 by any suitable light-pipe 17, such as a bundle of vinyl-covered optical fibers.

Referring to the operation of section 2 of the circuit in further detail, the operational amplifier 7 is connected as an integrator with external components resistor 31 and capacitor 10. If a voltage is applied to the input of amplifier 7, the output voltage would rise to −12 volts if left unhindered. However, the set level for the comparator amplifier 57 is −0.5 volt, and when the output of amplifier 7 reaches 10 millivolts over the set level the comparator output switches from −0.7v to ∼ +12 volts. The change of voltage and polarity acts through the bias circuit 13 and the F.E.T. 9, and the integrator is reset. When the time delay provided by network 73 is past, the ramp cycle starts anew. As explained below, the delay is required to fully discharge capacitor 10, to prevent the circuit from oscillating at a very high frequency unrelated to the signal input voltage.

When the integrator is reset, the comparator is also reset, but the comparator is not affected by the time delay. Thus, the output pulse is about one microsecond in duration. The characteristics of the L.E.D. 15 determine the duration of the light pulse about two microseconds. The operation of the delay is explained as follows: When the output of comparator amplifier 57 goes positive, transistor 69 turns "on". The capacitor in network 73 acts as a pulse speedup device to turn transistor 71 off without delay. Transistor 75 turns on, as does F.E.T. 9. The amplifier 57 output turns back to −0.7 volt and transistors 67 and 69 turn "off". However, when transistor 71 was turned off initially, the delay network became isolated with ∼ 5v on the base end of the capacitor and 15v on the emitter end. The capacitor tries to adjust so both plates are at 15 volts, but in about one microsecond transistor 69 turns off. Now the capacitor at the emitter end is at common, leaving the base of transistor 71 at a potential greater than 5 volts, which is the potential of the emitter of transistor 71. Transistor 71 will remain off until the capacitor discharges through the resistor across it to about 0.5 volts less than the emitter voltage. Thus, turn-off of the F.E.T. 9 is delayed for a time sufficient to completely discharge capacitor 10. If the delay is not present, the circuit will oscillate.

The above-described ramp-generating circuit 6, comparator 11, and F.E.T. bias network 13 can, if desired, be in the form of an integrated circuit. Microcircuitry can be used because the circuits employ no coils, which at the low frequencies of interest would necessarily be relatively large.

Figure 3:
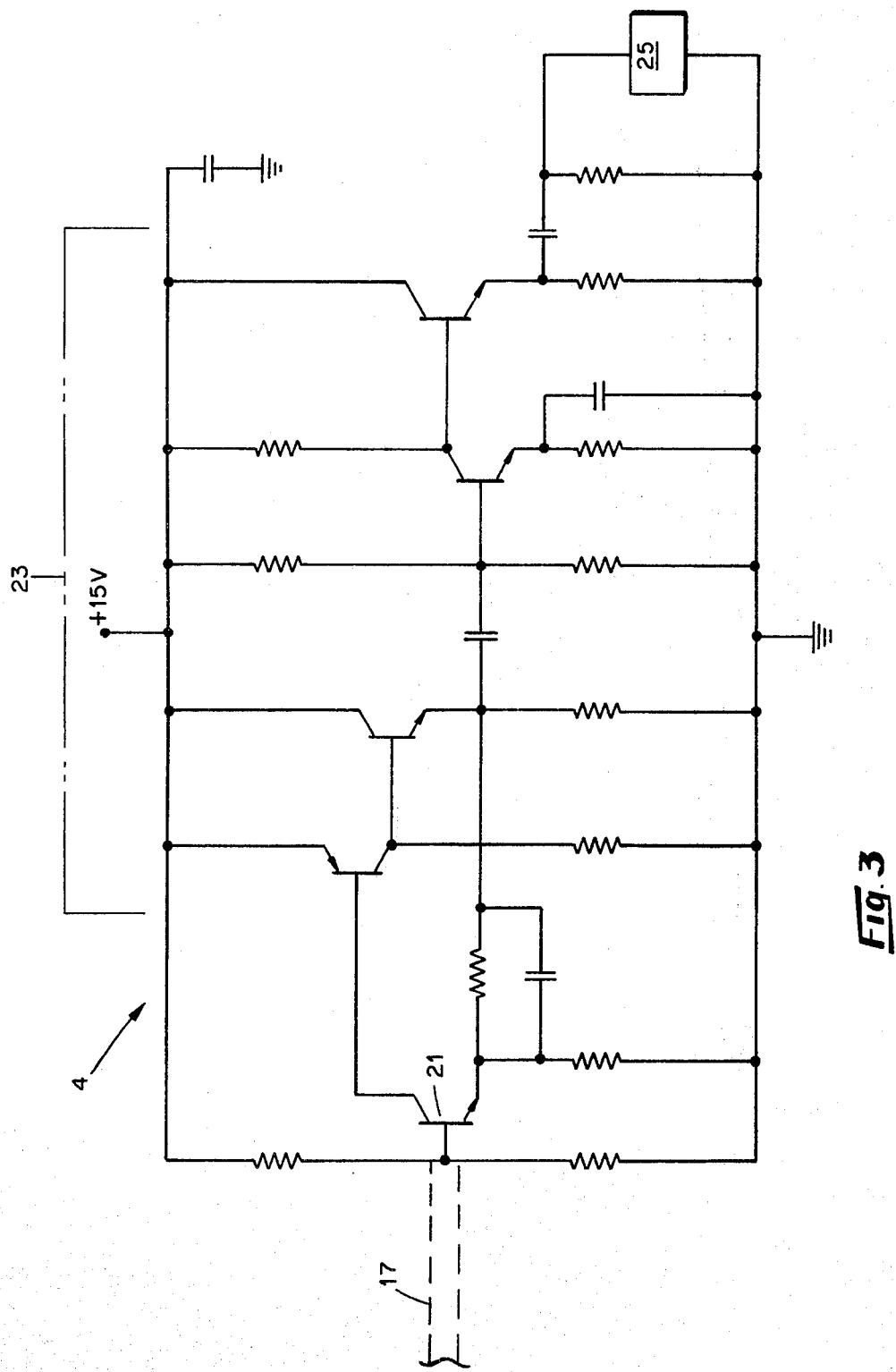
FIG. 3 is a schematic diagram of an output section 4 of the circuit shown in FIG. 1.

Referring now to FIG. 3, the light-pipe 17 is coupled to a phototransistor 21. Each light pulse received by the transistor is converted to an electrical pulse and is amplified by transistor circuitry 23 to about 300 millivolts as pulses having a duration of 10–20 microseconds. These are fed to the counter 25, which provides the time base for directly converting the number of pulses per second to the corresponding temperature—e.g., 197.4°F. The means 25 can be a ditigal-display frequency counter or any other suitable means for registering (i.e., recording or displaying) the frequency of the output signal.

The performance of a circuit of the kind described above was evaluated by comparing the digital readout of the counter 25 with a potentiometric thermocouple having a reference junction immersed in ice water. Throughout the range from 32° to 225°F, the temperature readouts differed by less than 1°.

What is claimed is:

1. A circuit for monitoring the operating temperature of a device situated in a region at relatively high electrical potential and for generating, in a region at a lower electrical potential, an output signal whose frequency is indicative of said temperature comprising:

thermocouple-including circuitry for generating a d.c. voltage proportional to said operating temperature;

a d.c. power supply;

a temperature-compensated operational amplifier for generating a linear ramp voltage whose time of rise varies inversely with the magnitude of said d.c. voltage, said amplifier having an input which is coupled to said circuitry through a resistor;

a comparator circuit operatively coupled to the operational amplifier for producing a negative output voltage when the magnitude of said ramp voltage is below a preselected value and for producing a positive output voltage when the magnitude of the ramp voltage increases to said preselected value;

a capacitor connected across the operational amplifier;

a field-effect transistor connected across said capacitor;

a switching circuit coupled to the output of said comparator circuit for biasing said transistor off when the output voltage of said comparator circuit is negative and for turning said transistor on when the output voltage of said comparator circuit swings positive and maintaining said transistor on for a time effecting complete discharge of said capacitor;

a light-pulse generating circuit which includes a light-emitting semiconductor component and is coupled to the output of said comparator circuit for energizing said component for a preselected period each time said comparator circuit output swings positive, thereby generating a train of light pulses whose repetition rate is proportional to said operating temperature; and an output circuit which includes a light-activated semiconductor device optically coupled to said light-emitting component for converting said train of light pulses to an electrical output signal having the same repetition rate.

2. The circuit of claim 1 wherein said switching circuit includes an RC network for maintaining said transistor on for a time effecting complete discharge of said capacitor.

3. The circuit of claim 1 wherein said light-emitting semiconductor is coupled to the output of said comparator circuit through an amplifier.

4. The circuit of claim 1 wherein the pulse rate of said output signal equals said operating temperature as expressed in terms of a selected temperature scale.

5. The circuit of claim 1 wherein said output circuit includes means for registering the frequency of said output signal.

6. The circuit of claim 1 wherein said circuitry includes a thermocouple having a measuring junction exposed to said operating temperature and a reference junction exposed to ambient temperature.

7. The circuit of claim 6 wherein said circuitry includes means for producing across said resistor a voltage drop offsetting variations in the output of said reference junction resulting from variations in the ambient temperature from a preselected reference value.

8. The circuit of claim 7 wherein said resistor and reference junction have a common terminal which is connected to said d.c. power supply through a series circuit including a negative-temperature-coefficient thermistor and a resistor.

9. The circuit of claim 1 wherein said power supply includes means for stabilizing its output with respect to variations in ambient temperature.

* * * * *